US012033595B2

(12) United States Patent
Kim et al.

(10) Patent No.: US 12,033,595 B2
(45) Date of Patent: Jul. 9, 2024

(54) DATA PROCESSING DEVICE FOR COMPENSATING FOR DATA AND DISPLAY DEVICE

(71) Applicant: SILICON WORKS CO., LTD., Daejeon (KR)

(72) Inventors: Yong Hee Kim, Daejeon (KR); Jung Eun Baek, Daejeon (KR); Jin Woo Park, Daejeon (KR); Ji Won Lee, Daejeon (KR); Do Seok Kim, Daejeon (KR); Young Gi Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 169 days.

(21) Appl. No.: 17/193,662

(22) Filed: Mar. 5, 2021

(65) Prior Publication Data

US 2021/0287620 A1 Sep. 16, 2021

(30) Foreign Application Priority Data

Mar. 10, 2020 (KR) ........................ 10-2020-0029564

(51) Int. Cl.
*G09G 3/36* (2006.01)

(52) U.S. Cl.
CPC ......... *G09G 3/3607* (2013.01); *G09G 3/3648* (2013.01); *G09G 3/3674* (2013.01); *G09G 3/3685* (2013.01); *G09G 2300/043* (2013.01); *G09G 2300/0443* (2013.01); *G09G 2320/0233* (2013.01); *G09G 2320/0242* (2013.01); *G09G 2320/0252* (2013.01)

(58) Field of Classification Search
CPC .. G09G 3/3607; G09G 3/3648; G09G 3/3674; G09G 3/3685; G09G 2300/0443; G09G 2300/043; G09G 2320/0233; G09G 2320/0242; G09G 2320/0252
See application file for complete search history.

(56) References Cited

U.S. PATENT DOCUMENTS

| | | | | |
|---|---|---|---|---|
| 8,686,933 | B2 | 4/2014 | Kim et al. | |
| 2007/0216632 | A1* | 9/2007 | Lee | G09G 3/3677 345/100 |
| 2008/0278433 | A1* | 11/2008 | Lee | G09G 3/344 345/107 |
| 2020/0111405 | A1* | 4/2020 | Kim | G09G 3/2092 |
| 2020/0219432 | A1* | 7/2020 | Park | G09G 3/2003 |
| 2020/0219460 | A1* | 7/2020 | Hu | G09G 5/06 |

FOREIGN PATENT DOCUMENTS

| | | | |
|---|---|---|---|
| JP | 6130962 | B1 | 5/2017 |
| KR | 10-2009-0129214 | A | 12/2009 |
| KR | 10-2013-0018025 | A | 2/2013 |
| KR | 10-2015-0089342 | A | 8/2015 |
| KR | 10-2018-0002966 | A | 1/2018 |
| KR | 10-2018-0007038 | A | 1/2018 |

(Continued)

*Primary Examiner* — William Boddie
*Assistant Examiner* — Saifeldin E Elnafia
(74) *Attorney, Agent, or Firm* — ROTHWELL, FIGG, ERNST & MANBECK, P.C.

(57) ABSTRACT

An embodiment is able to improve the pure-color brightness ratio by compensating for image data of a current pixel on the basis of a result of comparing image data of a current pixel with image data of a previous pixel.

15 Claims, 11 Drawing Sheets

(56) References Cited

FOREIGN PATENT DOCUMENTS

| | | | |
|---|---|---|---|
| KR | 10-2018-0007623 | A | 1/2018 |
| KR | 10-2018-0062332 | A | 6/2018 |
| KR | 10-2019-0056659 | A | 5/2019 |
| KR | 10-2019-0058878 | A | 5/2019 |
| KR | 10-2019-0141039 | A | 12/2019 |
| KR | 10-2020-0006207 | A | 1/2020 |

* cited by examiner

*FIG. 5*

500

| Nth GRAYSCALE | AMOUNT |
|---|---|
| 255 | 20 |
| 200 | 17 |
| 175 | 14 |
| 150 | 10 |
| 125 | 7 |
| 100 | 4 |
| 75 | 3 |
| 50 | 2 |
| 25 | 2 |

FIG. 10

| N-1 \ N | 0 | 32 | 64 | 96 | 128 | 160 | 196 | 228 | 255 |
|---|---|---|---|---|---|---|---|---|---|
| 0 | 0 | 40 | 73 | 105 | 139 | 173 | 210 | 246 | 255 |
| 32 | 0 | 32 | 72 | 103 | 137 | 170 | 205 | 244 | 255 |
| 64 | 0 | 27 | 64 | 101 | 134 | 168 | 203 | 241 | 255 |
| 96 | 0 | 27 | 59 | 96 | 131 | 165 | 202 | 240 | 255 |
| 128 | 0 | 27 | 56 | 90 | 128 | 164 | 201 | 237 | 255 |
| 160 | 0 | 27 | 56 | 88 | 123 | 160 | 199 | 235 | 255 |
| 196 | 0 | 27 | 55 | 85 | 116 | 155 | 196 | 234 | 255 |
| 228 | 0 | 27 | 51 | 82 | 110 | 147 | 192 | 228 | 255 |
| 255 | 0 | 27 | 48 | 82 | 105 | 145 | 190 | 225 | 255 |

DATA PROCESSING DEVICE FOR COMPENSATING FOR DATA AND DISPLAY DEVICE

CROSS REFERENCE TO RELATED APPLICATION

This application claims priority from Republic of Korea Patent Application No. 10-2020-0029564, filed on Mar. 10, 2020, which is hereby incorporated by reference in its entirety.

BACKGROUND

1. Field of Technology

The present disclosure relates to a technology for compensating for image data.

2. Description of the Prior Art

The recent development of information technology has further emphasized the importance of a display as a transmission medium for visual information. In order to occupy an important position in the future, the displays must satisfy requirements such as low power consumption, a thin panel, light weight, high definition, and the like.

Among the display devices, a liquid crystal display (LCD) device using liquid crystal is a device that uses optical anisotropy of liquid crystal, and was developed to replace a cathode ray tube (CRT) because it has advantages such as a thin panel, a small size, low power consumption, high definition, and the like.

The liquid crystal display device may have a backlight unit (BLU) for supplying light because the liquid crystal is unable to emit light by itself. The luminescence of the liquid crystal may be related to a response speed of how quickly the liquid crystal transmits light. Therefore, various measures have been proposed to improve the response speed of the liquid crystal.

A typical method may be to compensate for image data and to increase or reduce a data voltage for the image data so as to correspond to the compensated image data. Therefore, the liquid crystal display device may compare current image data with previous image data, and, if the value of the current image data is greater than that of the previous image data, may apply a voltage greater than the data voltage for the current image data, and, if the value of the current image data is less than that of the previous image data, may apply a voltage lower than the data voltage for the current image data. Here, the liquid crystal display device may compare the image data on the basis of lines (compare image data of a current line with image data of a previous line) or frames (compare image data of a current frame with image data of a previous frame).

However, if the image data is compared on the basis of lines or frames, there may be limitations. For example, a liquid crystal display device having a dual gate has a characteristic in which a plurality of lines are arranged, so it may be difficult to compensate for image data through comparison between lines. Therefore, the time for applying a data voltage (i.e., charging time) may be insufficient. In addition, since the conventional method focuses on improving the response speed of the liquid crystal, it may not be easy to improve both the response speed of the liquid crystal and the pure-color brightness ratio. Further, even if the conventional method improves the pure-color brightness ratio, the effect may be insignificant because the degree of improvement differs depending on the grayscale value.

SUMMARY

In this regard, the present embodiment is to provide an image data compensation technology for improving brightness by improving the response speed of the liquid crystal and increasing the pure-color brightness ratio.

An objective of the present embodiment is to provide an image data compensation technique for performing first compensation for improving the response speed of the liquid crystal and second compensation for increasing the pure-color brightness ratio.

Another objective of the present embodiment is to provide an image data compensation technique by considering the difference between image data of a current pixel and image data of a previous pixel and the value of the image data of the current pixel for the second compensation for increasing the pure-color brightness ratio.

In order to attain the objectives described above, an embodiment provides a data processing device for generating image data for a first subpixel and a second subpixel of different colors, which are connected to one data line, the data processing device including: a first data compensating circuit configured to generate compensated image data for applying overdriving or under driving to grayscale values of image data for the first subpixel and the second subpixel that is driven after the first subpixel in sequence; and a second data compensating circuit configured, if a grayscale value of compensated image data of the first subpixel and a grayscale value of compensated image data of the second subpixel are the same or different within a predetermined range, to reduce the grayscale value of the compensated image data of the second subpixel.

In the device, the second data compensating circuit may reduce the grayscale value of the compensated image data of the second subpixel by reflecting a difference between the grayscale value of the compensated image data of the first subpixel and the grayscale value of the compensated image data of the second subpixel.

In the device, the second data compensating circuit may reduce the grayscale value of the compensated image data of the second subpixel by a larger amount as the difference between the grayscale value of the compensated image data of the first subpixel and the grayscale value of the compensated image data of the second subpixel is reduced.

In the device, the second data compensating circuit may reduce the grayscale value of the compensated image data of the second subpixel by a smaller amount as the difference between the grayscale value of the compensated image data of the first subpixel and the grayscale value of the compensated image data of the second subpixel is increased.

In the device, the second data compensating circuit may determine a reduction amount of the grayscale value of the compensated image data of the second subpixel by reflecting the grayscale value of the compensated image data of the second subpixel.

In the device, the second data compensating circuit may reduce the grayscale value of the compensated image data of the second subpixel by a larger amount as the grayscale value of the compensated image data of the second subpixel is increased.

In the device, the second data compensating circuit may reduce the grayscale value of the compensated image data of the second subpixel by a smaller amount as the grayscale value of the compensated image data of the second subpixel is reduced.

In the device, the second data compensating circuit may determine the reduction amount of the grayscale value for the compensated image data of the second subpixel using a look-up table.

In the device, the first subpixel and the second subpixel may be arranged in the same row on a display panel, and may be connected to different gate lines from each other.

Another embodiment provides a data processing device for generating image data for a first subpixel and a second subpixel of different colors, which are connected to one data line, the data processing device including: a comparing circuit configured to compare image data of a first subpixel with image data of a second subpixel that is driven after the first subpixel in sequence; and a data compensating circuit configured, if a grayscale value of the image data of the first subpixel and a grayscale value of the image data of the second subpixel are the same or different within a predetermined range, to reduce the grayscale value of the image data of the second subpixel, thereby generating compensated image data of the second subpixel.

In the device, the data compensating circuit may adjust a reduction amount of the grayscale value of the image data of the second subpixel to be increased or reduced by reflecting a difference between the grayscale value of the image data of the first subpixel and the grayscale value of the image data of the second subpixel.

In the device, the data compensating circuit may adjust a reduction amount of the grayscale value of the image data of the second subpixel to be increased or reduced by reflecting the grayscale value of the image data of the second subpixel.

In the device, the one data line may cross a plurality of gate lines, and the first subpixel and the second subpixel may be connected to the one data line, and may be connected to respective ones of the plurality of gate lines.

In the device, a pure-color brightness ratio for a frame including the grayscale value of the compensated image data of the second subpixel may be greater than a pure-color brightness ratio for a frame including the grayscale value of the image data of the second subpixel, and the pure-color brightness ratio may be defined as a ratio of the sum of brightness values of red, green, and blue to the brightness of white.

In the device, the first subpixel and the second subpixel may be arranged in the same row on a display panel, and may be connected to different gate lines from each other As described above, according to the present embodiment, it is possible to improve the response speed of the liquid crystal and image quality by compensating for the data voltage in units of pixels (overdriving or underdriving).

In addition, according to the present embodiment, it is possible to improve a pure-color brightness ratio, which is defined as the ratio of the sum of the brightness values of red, green, and blue to the brightness of white, by further reducing the brightness of white thereof.

BRIEF DESCRIPTION OF THE DRAWINGS

FIG. 5 is a diagram illustrating an example of a look-up table used to adjust a reduction amount of grayscale value of a current subpixel by reflecting a grayscale value of the current subpixel according to an embodiment.

FIG. 10 is a diagram illustrating an example of a look-up table used to generate compensated image data according to another embodiment.

DETAILED DESCRIPTION

Figure 1:
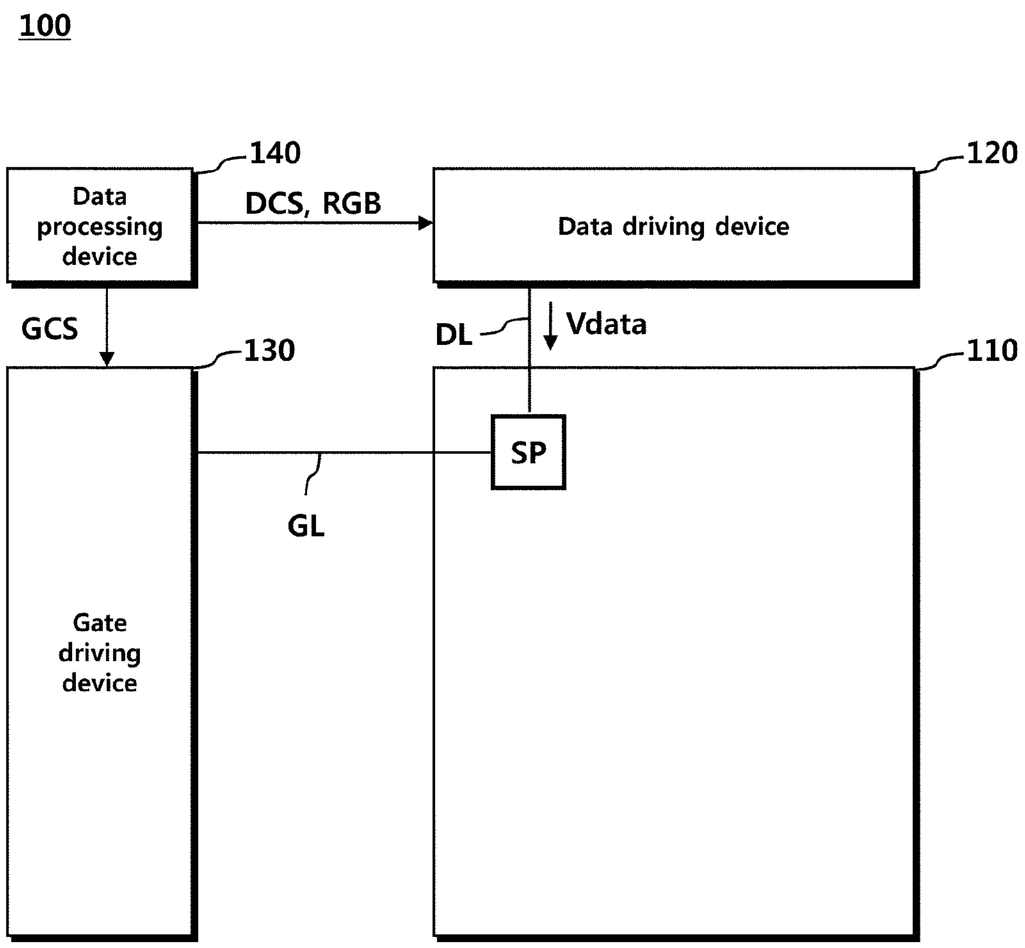
FIG. 1 is a diagram illustrating the configuration of a display device according to an embodiment.

FIG. 1 is a diagram illustrating the configuration of a display device according to an embodiment.

Referring to FIG. 1, a display device 100 may include a panel 110, a data driving device 120, a gate driving device 130, a data processing device 140, and the like.

A plurality of data lines DL and a plurality of gate lines GL may be arranged on the panel 110, and a plurality of pixels may be arranged thereon. The pixel may include a plurality of subpixels SP. Here, the subpixel may be R (red), G (green), B (blue), W (white), or the like. One pixel may be configured as RGB subpixels SP, RGBG subpixels SP, or RGBW subpixels SP. Hereinafter, for convenience of description, a description will be made on the consumption that one pixel includes RGB subpixels.

The data driving device 120, the gate driving device 130, and the data processing device 140 are devices that generate signals for displaying an image on the panel 110.

The gate driving device 130 may supply gate driving signals of a turn-on voltage or a turn-off voltage to the gate lines GL. If a gate driving signal of a turn-on voltage is supplied to the subpixel SP, the subpixel SP is connected to the data line DL. In addition, if a gate driving signal of a turn-off voltage is supplied to the subpixel SP, the connection between the subpixel SP and the data line DL is released. The gate driving device 130 may be referred to as a "gate driver".

The data driving device 120 may supply a data voltage Vdata to the subpixel SP through the data line DL. The data voltage Vdata supplied to the data line DL may be supplied to the subpixel SP according to the gate driving signal. The data driving device 120 may be referred to as a "source driver".

The data driving device 120 may generate a plurality of gamma voltages, and may output a data voltage Vdata corresponding to image data RGB among the plurality of gamma voltages. The data driving device 120 may include a digital-to-analog converter and a buffer. The digital-to-analog converter may select one of the plurality of gamma voltages in response to image data RGB, and may output the one selected voltage to the buffer. The buffer may amplify the one selected voltage, and may apply a data voltage Vdata to the subpixel SP through the data line DL.

The data driving device 120 may include at least one integrated circuit, and the at least one integrated circuit may be connected to a bonding pad of the panel 110 by a tape automated bonding (TAB) type or a chip-on-glass (COG) type, or may be formed directly on the panel 110, or may be formed by being integrated on the panel 110 according to an embodiment. In addition, the data driving device 120 may be implemented as a chip-on-film (COF) type.

The data processing device 140 may supply control signals to the gate driving device 130 and the data driving device 120. For example, the data processing device 140 may transmit, to the gate driving device 130, a gate control signal GCS for starting scanning. In addition, the data processing device 140 may output image data RGB to the data driving device 120. In addition, the data processing device 140 may transmit a data control signal DCS for controlling the data driving device 120 to supply the data voltage Vdata to each subpixel SP. The data processing device 140 may be referred to as a "timing controller".

Figure 2:
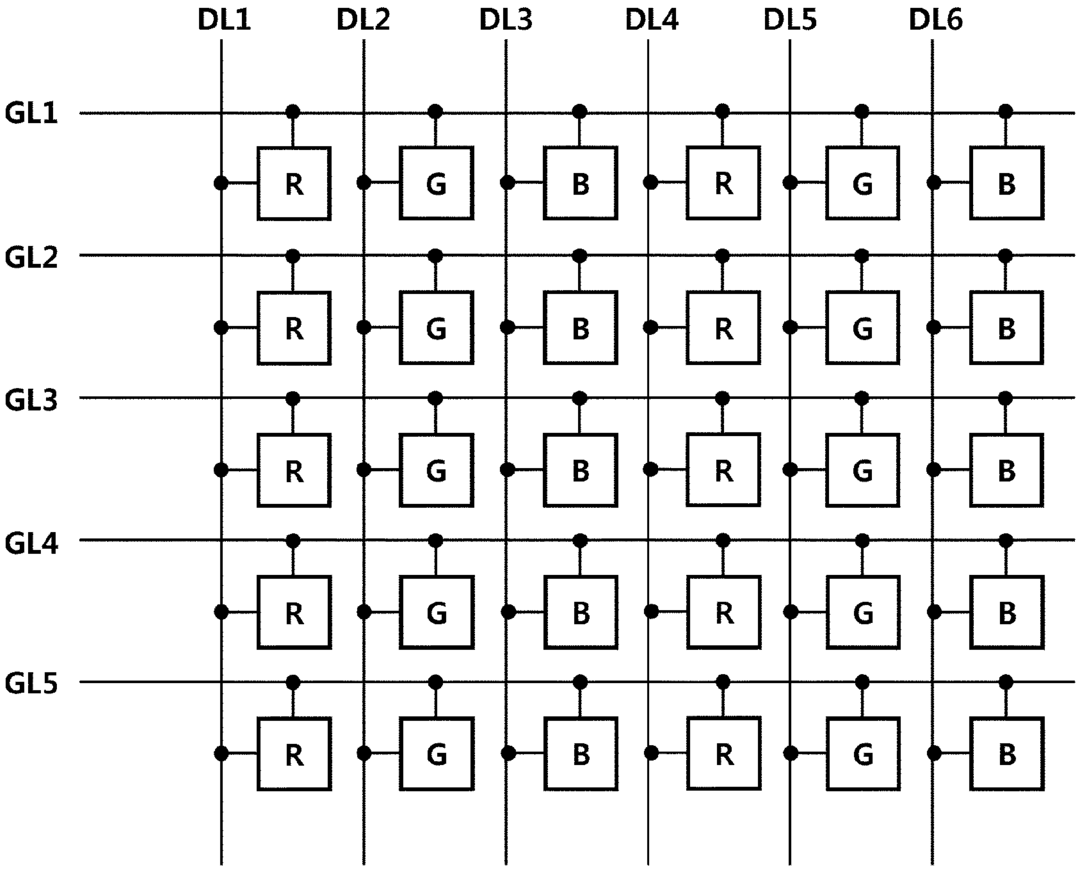
FIG. 2 is a diagram illustrating connection of subpixels included in a panel according to an embodiment.

FIG. 2 is a diagram illustrating connection of subpixels included in a panel according to one embodiment.

Referring to FIG. 2, an example of general connection of subpixels is shown. Only subpixels having the same color may be connected to one data line. For example, if one pixel includes a plurality of subpixels of RGB, the respective subpixels are arranged in the order of RGB along one gate line, and are connected to the one gate line. Therefore, a R subpixel may be connected to a first data line DL1, a G subpixel may be connected to a second data line DL2, and a B subpixel may be connected to a third data line DL3, respectively. Subpixels of RGB may be sequentially connected to fourth to sixth data lines DL4 to DL6 in the same manner.

When one subpixel is scanned by one gate line, a data voltage may be received through one data line. For example, if any one of the first to fifth gate lines GL1 to GL5 is driven, and if a data voltage is applied through the first data line DL1, the data voltage may be applied to the R subpixel.

Figure 3:
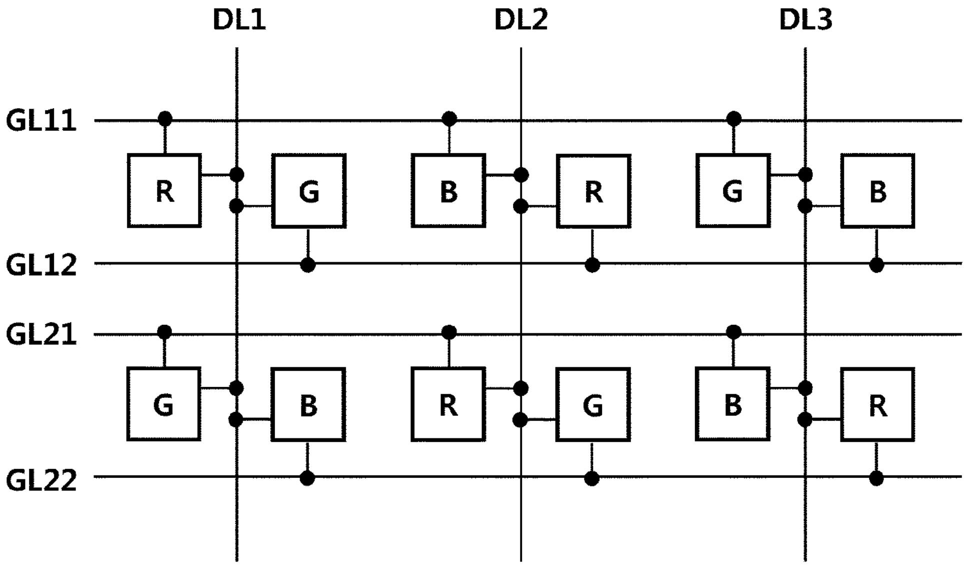
FIG. 3 is a diagram illustrating connection of subpixels included in a panel according to an embodiment.

FIG. 3 is a diagram illustrating connection of subpixels included in a panel according to an embodiment.

Referring to FIG. 3, an example of connection of subpixels according to an embodiment is illustrated. A plurality of subpixels having different colors may be connected to one data line. For example, in the case where one pixel includes a plurality of subpixels of RGB, two subpixels having different colors may be connected to one data line, and the two subpixels may be connected to different gate lines from each other. Therefore, both the R subpixel and the G subpixel may be connected to the first data line DL1, and the R subpixel and the G subpixel may be connected to a 1-$1^{st}$ gate line GL11 and a 1-$2^{nd}$ gate line GL12, respectively. In addition, both the G subpixel and the B subpixel may be connected to the first data line DL1, and the G subpixel and the B subpixel may be connected to a 2-$1^{st}$ gate line GL21 and a 2-$2^{nd}$ gate line GL22, respectively.

Such an arrangement structure is sometimes referred to as a "dual gate structure". In the dual gate structure, two subpixels connected to one data line may form the same row in the panel, but may be connected to different gate lines from each other.

The plurality of subpixels may be arranged to alternate along a plurality of gate lines. For example, the subpixels may be arranged in the order of RGB between the 1-$1^{st}$ gate line GL11 and the 1-$2^{nd}$ gate line GL12 on the basis of the first data line DL1. On the other hand, the subpixels may be arranged in the order of GBR, which is different from the order of RGB, between the 2-$1^{st}$ gate line GL21 and the 2-$2^{nd}$ gate line GL22.

If a plurality of subpixels are scanned by one gate line, a data voltage may be received through one data line. However, since the number of data lines is reduced and the number of gate lines is increased in the example of pixel connection according to an embodiment, unlike the example of general pixel connection, the data voltage may be applied more frequently through one data line. For example, if one gate line is driven in FIG. 2, a data voltage may be applied to six subpixels RGBRGB connected to the one gate line at a time. On the other hand, in FIG. 3, if the 1-$1^{st}$ gate line GL11 is driven, a data voltage is applied to three subpixels RBG connected to the 1-$1^{st}$ gate line GL11, and then if 1-$2^{nd}$ gate line GL12 is driven, the data voltage may be applied to three subpixels GRB connected to the 1-$2^{nd}$ gate line GL12. In order to drive six subpixels RGBRGB, the data voltage may be applied twice to the first to third data lines DL1 to DL3.

Figure 4:
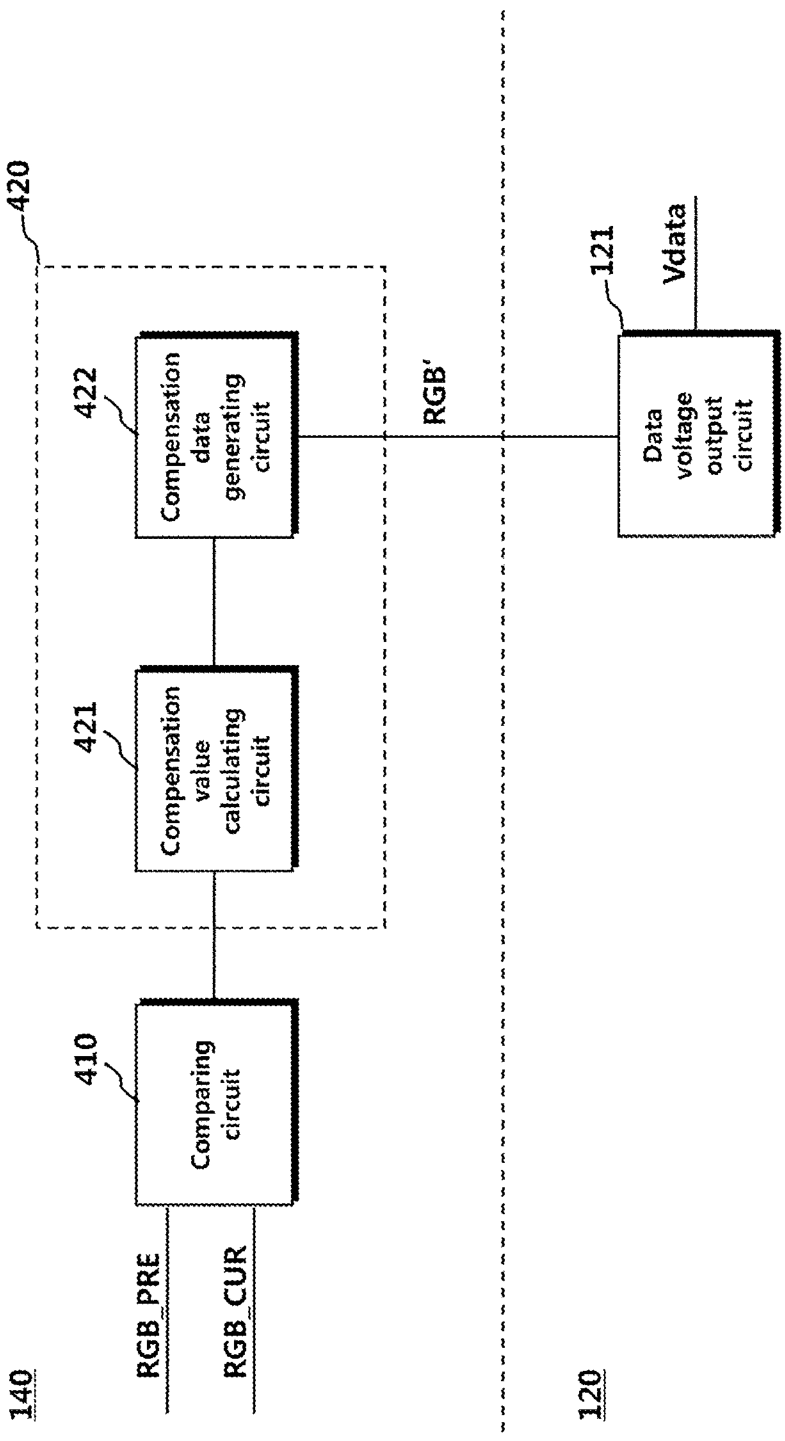
FIG. 4 is a diagram illustrating the configuration of a data processing device according to an embodiment.

FIG. 4 is a diagram illustrating the configuration of a data processing device 140 according to an embodiment.

Referring to FIG. 4, a data processing device 140 according to an embodiment may include a comparing circuit 410 and a data compensating circuit 420, and a data driving device 120 may include a data voltage output circuit 121. In addition, the data compensating circuit 420 may include a compensation value calculating circuit 421 and a compensation data generating circuit 422.

The data processing device 140 may generate image data for a plurality of subpixels having different colors, which are connected to one data line. To this end, the data processing device 140 may compare image data of a first subpixel with image data of a second subpixel that is driven after the first subpixel, and, if the image data of the first subpixel and the image data of the second subpixel are the same or different within a predetermined range, may reduce a grayscale value of the image data of the second subpixel, thereby generating compensated image data. If the compensated image data is output, the pure-color brightness ratio of the image may be increased.

The pure-color brightness ratio may be defined as the ratio of the sum of brightness values of red, green, and blue to the brightness of white. That is, the pure-color brightness ratio may be "(R brightness+G brightness+B brightness)/W brightness". R brightness may indicate brightness for red, G brightness may indicate brightness for green, B brightness may indicate brightness for blue, and W brightness may indicate brightness for white. The data processing device 140 may reduce W brightness through compensation of reducing the grayscale value or data voltage corresponding to the image data of the current pixel, thereby increasing the total pure-color brightness ratio. Therefore, the data processing device 140 may improve the pure-color brightness ratio.

Hereinafter, the configuration of the data processing device 140 according to an embodiment will be described. The comparing circuit 410 may compare image data RGB_CUR of a current subpixel with image data RGB_PRE of a previous subpixel. The comparing circuit 410 may transfer a result of the comparison to the data compensating circuit 420.

Here, the current subpixel may be understood as a subpixel that is driven after the previous subpixel in time. The current subpixel and the previous subpixel may be located on the same line or on different lines. For example, the previous subpixel and the current subpixel located on the same line in FIG. 3 may be an R subpixel and a G subpixel, respectively, which are connected to the first data line DL1, between the 1-$1^{st}$ gate line GL11 and the 1-$2^{nd}$ gate line GL12. The previous subpixel and the current subpixel located on different lines in FIG. 3 may be a G subpixel, which is connected to the first data line DL1, between the 1-$1^{st}$ gate line GL11 and the 1-$2^{nd}$ gate line GL12, and a G subpixel, which is connected to the first data line DL1, between the 2-$1^{st}$ gate line GL21 and the 2-$2^{nd}$ gate line GL22.

If the image data RGB_CUR of the current subpixel and the image data RGB_PRE of the previous subpixel are the same or different but within a predetermined range, the data compensating circuit 420 may compensate for the image data RGB_CUR of the current subpixel such that a data voltage (or a grayscale value) corresponding to the image data RGB_CUR of the current pixel is reduced, thereby generating compensated image data RGB'.

The compensation value calculating circuit 421 may receive a result of comparing the image data RGB_CUR of the current subpixel with the image data RGB_PRE of the previous subpixel from the comparing circuit 410, and may calculate a compensation value indicating how much the image data RGB_CUR of the current subpixel is to be compensated for. The compensation value calculating circuit 421 may determine whether or not a grayscale value of the image data RGB_CUR of the current subpixel and a grayscale value of the image data RGB_PRE of the previous subpixel are the same or similar (the degree of difference within a predetermined range). If the grayscale value of the image data RGB_CUR of the current subpixel and the grayscale value of the image data RGB_PRE of the previous subpixel are the same or different within a predetermined range, the compensation value calculating circuit 421 may calculate a compensation value for reducing the grayscale value of the image data RGB_CUR of the current subpixel. That is, the compensation value calculating circuit 421 may calculate a reduction amount as the compensation value. The value of the image data RGB_CUR of the current subpixel may be reduced by the reduction amount, and compensated image data RGB' including the reduced value may be generated.

The compensation data generating circuit 422 may generate compensated image data. The compensation data generating circuit 422 may receive, from the compensation value calculating circuit 421, a compensation value including the reduction amount of image data RGB_CUR of the current subpixel. The compensation data generating circuit 422 may reduce the value of image data RGB_CUR of the current subpixel by the reduction amount according to the compensation value, thereby generating compensated image data RGB'.

In addition, the data compensating circuit 420 may adjust the compensated image data RGB' by reflecting a difference between the image data RGB_CUR of the current subpixel and the image data RGB_PRE of the previous subpixel. As the difference between the image data RGB_CUR of the current subpixel and the image data RGB_PRE of the previous subpixel is reduced, the compensation value calculating circuit 421 of the data compensating circuit 420 may configure the reduction amount of the image data RGB_CUR of the current subpixel to be larger. Alternatively, as the difference between the image data RGB_CUR of the current subpixel and the image data RGB_PRE of the previous subpixel is increased, the compensation value calculating circuit 421 of the data compensating circuit 420 may configure the reduction amount of the image data RGB_CUR of the current subpixel to be smaller.

The data compensating circuit 420 may perform additional adjustment on the generated compensated image data RGB' by reflecting the difference between the image data RGB_CUR of the current subpixel and the image data RGB_PRE of the previous subpixel, or may reflect the difference in advance, thereby generating compensated image data RGB'.

In addition, the data compensating circuit 420 may adjust the compensated image data RGB' by reflecting the value of the image data RGB_CUR of the current subpixel. As the value of the image data RGB_CUR of the current subpixel is increased, the compensation value calculating circuit 421 of the data compensating circuit 420 may configure the reduction amount of the image data RGB_CUR of the current subpixel to be larger. Alternatively, as the value of the image data RGB_CUR of the current subpixel is reduced, the compensation value calculating circuit 421 of the data compensating circuit 420 may configure the reduction amount of the image data RGB_CUR of the current subpixel to be smaller.

The data voltage output circuit 121 may receive the compensated image data RGB' from the data processing device 140, may generate a data voltage corresponding to the compensated image data RGB', and may output the same to the display panel.

As described above, the data processing device 140 may reduce the grayscale value of the image data RGB_CUR of the current subpixel if the image data RGB_CUR of the current subpixel and the image data RGB_PRE of the previous subpixel are the same or the difference therebetween falls within a predetermined range, may reduce the reduction amount thereof as the difference between the image data RGB_CUR of the current subpixel and the image data RGB_PRE of the previous subpixel is increased, and may increase the reduction amount thereof as the difference between the image data RGB_CUR of the current subpixel and the image data RGB_PRE of the previous subpixel is reduced.

Therefore, the brightness of white (i.e., denominator) in the equation of the pure-color brightness ratio becomes smaller, so the pure-color brightness ratio itself may be increased. Accordingly, the pure-color brightness ratio for the frame including the compensated image data RGB' may be greater than the pure-color brightness ratio for the frame including the image data RGB_CUR of the current subpixel.

FIG. 5 is a diagram illustrating an example of a look-up table 500 used to adjust the reduction amount of a grayscale value of a current subpixel by reflecting a grayscale value of the current subpixel according to an embodiment.

Referring to FIG. 5, a data processing device 140 according to an embodiment may determine a reduction amount of compensated image data of a current subpixel using a look-up table (LUT) 500.

If a grayscale value of the previous subpixel and a grayscale value of the current subpixel are the same or different but within a predetermined range, the data processing device 140 may reduce the grayscale value of the current subpixel. Furthermore, the data processing device 140 may adjust the reduction amount by reflecting the grayscale value of the current subpixel. To this end, the data processing device 140 may select a reduction amount for the grayscale value of the current subpixel from the look-up table 500.

For example, the look-up table 500 may be configured as grayscale values (Nth GRAYSCALE) of the current subpixel and reduction amounts (AMOUNT) corresponding thereto. According to the look-up table 500, if the grayscale value of the current subpixel is 255, the data processing device 140 may determine the reduction amount to be 20. In this case, the data processing device 140 may further reduce the grayscale value by 20 from the value of 255, and may finally reduce the same only by 20. This may be applied to other grayscale values of the current subpixel in the same manner A corresponding relationship between other grayscale values of the current subpixel and the reduction amounts may be predetermined, and the look-up table 500 may be pre-stored in a storage circuit.

Figure 6:
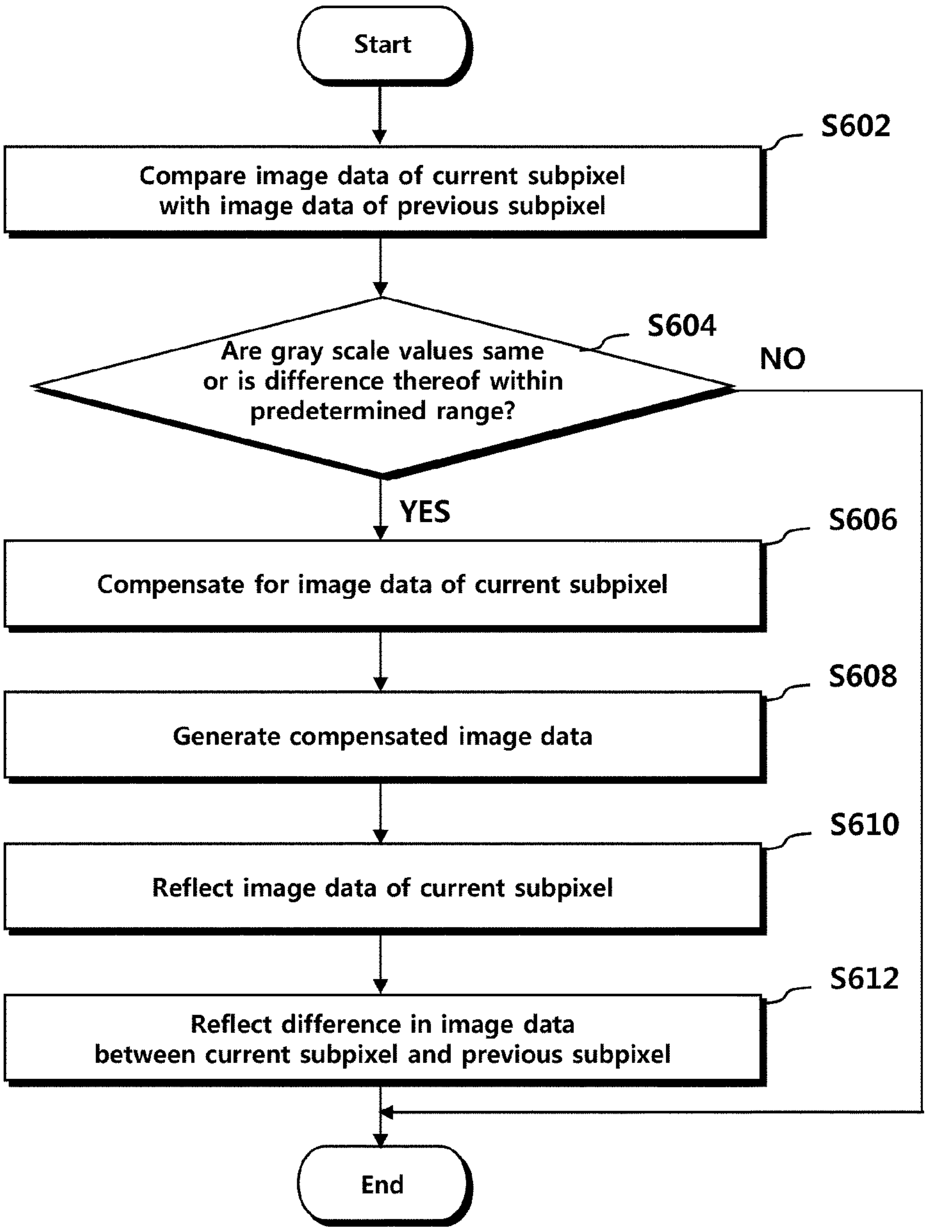
FIG. 6 is a flowchart illustrating the operation of a data processing device according to an embodiment.

FIG. 6 is a flowchart illustrating the operation of a data processing device 140 according to an embodiment.

Referring to FIG. 6, the data processing device 140 may compare image data of a current subpixel with image data of a previous subpixel (S602).

The data processing device 140 may determine whether or not the image data of the current subpixel and the image data of the previous subpixel are the same or whether or not the difference therebetween falls within a predetermined range (S604).

If the image data of the current subpixel and the image data of the previous subpixel are the same, or if the difference therebetween falls within a predetermined range (YES in S604), the data processing device 140 may compensate for the image data of the current subpixel (S606). The compensation value calculating circuit 421 of the data processing device 140 may determine a reduction amount indicating how much the image data of the current subpixel is to be reduced.

If the image data of the current subpixel and the image data of the previous subpixel are not the same, and if the difference therebetween does not fall within a predetermined range (NO in S604), the data processing device 140 may terminate the operation without compensating for the image data of the current subpixel.

In addition, the data processing device 140 may compensate for the image data of the current subpixel, thereby generating compensated image data (S608). The grayscale value of the compensated image data may be reduced by the reduction amount from the grayscale value of the image data of the current subpixel.

The data processing device 140 may adjust the compensated image data by reflecting the image data of the current subpixel (S610). In addition, the data processing device 140 may adjust the compensated image data by reflecting the difference between the image data of the current subpixel and the image data of the previous subpixel (S612). In this process, the data compensating circuit 420 of the data processing device 140 may perform additional adjustment on the generated compensated image data, or may reflect the image data of the current pixel or the difference in advance, thereby generating compensated image data.

Figure 7:
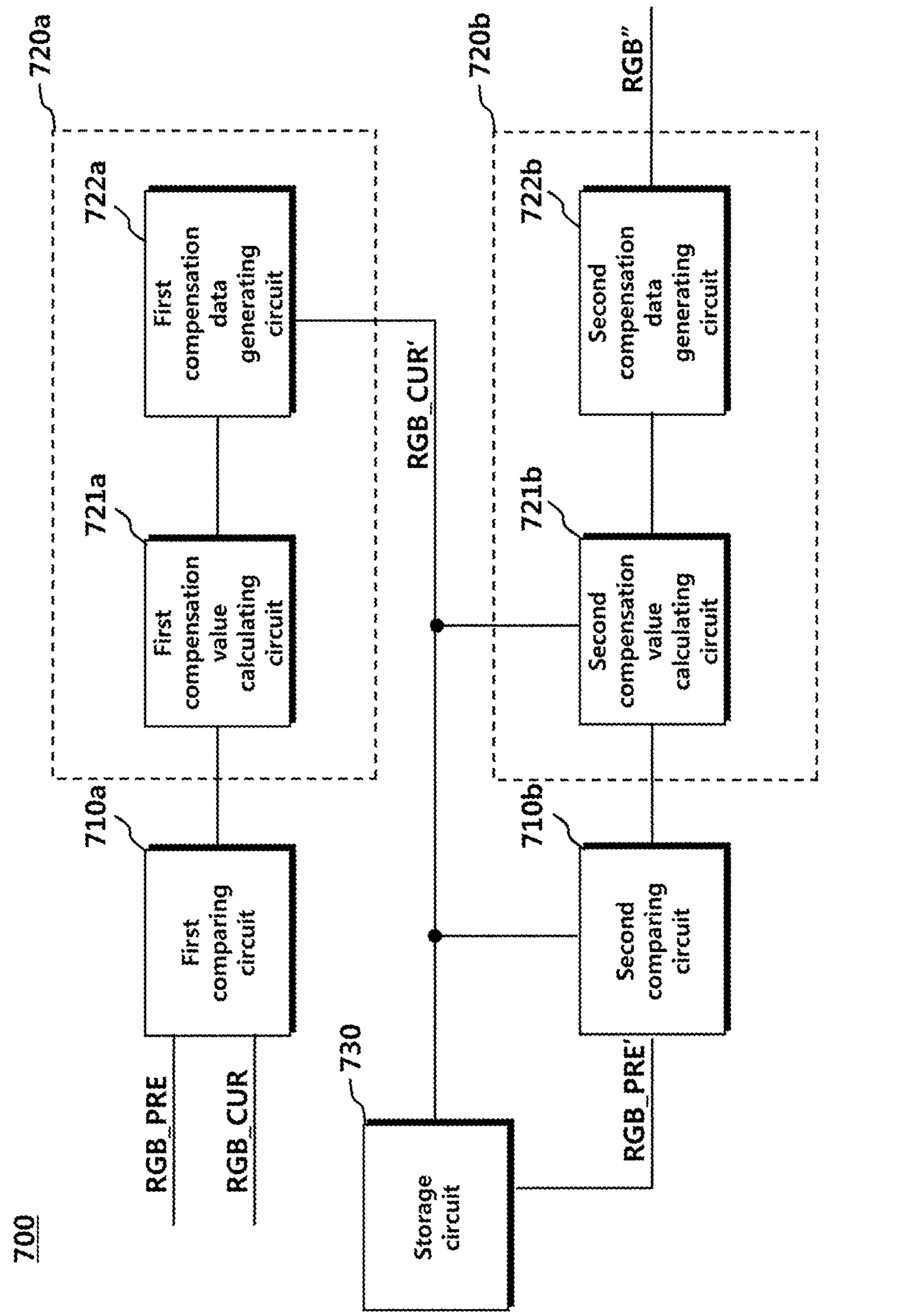
FIG. 7 is a diagram illustrating the configuration of a data processing device according to another embodiment.
Figure 8:
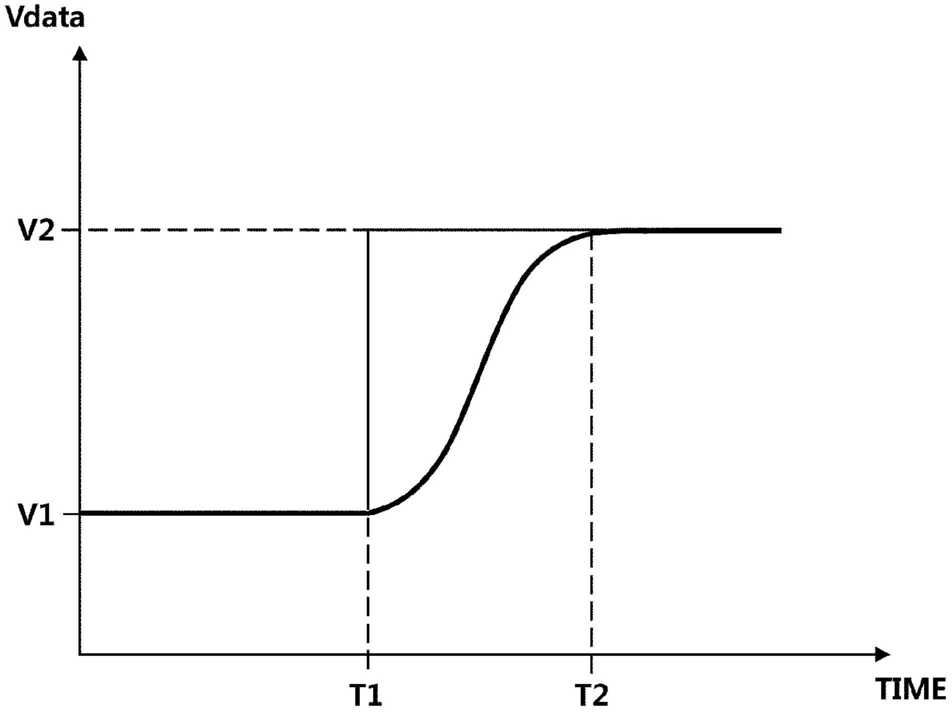
FIG. 8 is a diagram illustrating a change in a data voltage between a previous subpixel and a current subpixel in the case where first compensation is not performed according to another embodiment.
Figure 9:
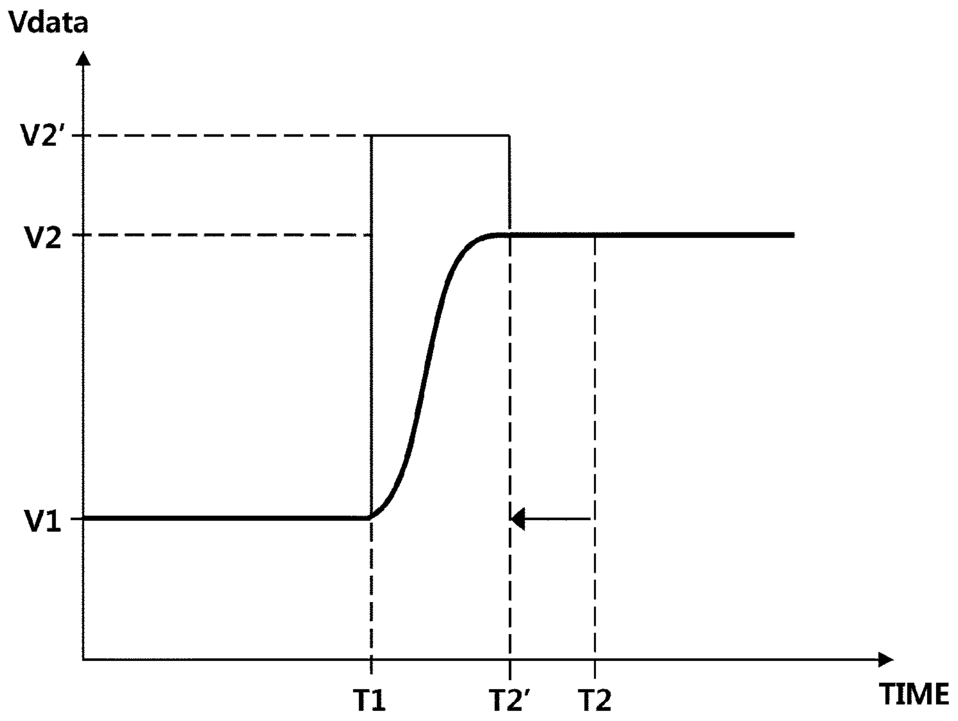
FIG. 9 is a diagram illustrating a change in a data voltage between a previous subpixel and a current subpixel in the case where first compensation is performed according to another embodiment.

FIG. 7 is a diagram illustrating the configuration of a data processing device 700 according to another embodiment, FIG. 8 is a diagram illustrating a change in a data voltage between a previous subpixel and a current subpixel in the case where first compensation is not performed according to another embodiment, FIG. 9 is a diagram illustrating a change in a data voltage between a previous subpixel and a current subpixel in the case where first compensation is performed according to another embodiment, and FIG. 10 is a diagram illustrating an example of a look-up table used to generate compensated image data according to another embodiment.

Referring to FIG. 7, a data processing device 700 according to another embodiment may include a first comparing circuit 710*a*, a second comparing circuit 710*b*, a first data compensating circuit 720*a*, a second data compensating circuit 720*b*, and a storage circuit 730. The first data compensating circuit 720*a* may include a first compensation value calculating circuit 721*a* and a first compensation data generating circuit 722*a*, and the second data compensating circuit 720*b* may include a second compensation value calculating circuit 721*b* and a second compensation data generating circuit 722*b*.

If image data of the current subpixel is different from image data of the previous subpixel, the data processing device 700 may compensate for the image data of the current subpixel such that a data voltage for the image data of the current subpixel is increased or reduced. This process may be defined as "first compensation".

Thereafter, if compensated image data of the current subpixel is the same as or similar to compensated image data of the previous subpixel, the data processing device 700 may further compensate for the compensated image data of the current subpixel such that a data voltage or a grayscale value for the compensated image data of the current subpixel is reduced. This process may be defined as "second compensation".

Accordingly, the data processing device 700 may perform first compensation on the image data of the current subpixel, and may then perform second compensation on the compensated image data of the current subpixel.

Here, according to another embodiment, the data processing device 700 may perform the second compensation, as well as the first compensation, in order to improve the pure-color brightness ratio. This is due to the fact that even if the data processing device 700 increases the brightness of the R subpixel, the G subpixel, and the B subpixel through the first compensation, there may be limitation as to improvement of the pure-color brightness ratio. For example, if the brightness increases in a medium grayscale value or a low grayscale value, the pure-color brightness ratio improves, but if the brightness further increases, the gamma curve may be deformed. On the other hand, since an increase in the brightness is limited at a high grayscale value, there may be no or insignificant change in the pure-color brightness ratio. The data processing device 700 may perform the second compensation because of this limitation of the first compensation.

In the following description of the configuration of the data processing device 700 according to another embodiment, the first comparing circuit 710*a* may compare image data RGB_CUR of the current subpixel with image data RGB_PRE of the previous subpixel. The first comparing circuit 710*a* may transfer a result of the comparison to the first data compensating circuit 720*a*.

If the image data RGB_CUR of the current subpixel and the image data RGB_PRE of the previous subpixel are different, the first data compensating circuit 720*a* may compensate for the image data of the current subpixel such that a data voltage or grayscale value corresponding to the image data of the current subpixel is further increased or reduced, thereby generating compensated image data RGB_PRE'. Here, the operation of increasing the grayscale value and outputting the same to the panel refers to "overdriving", and the operation of reducing the grayscale value and outputting the same to the panel refers to "underdriving".

FIG. 8 illustrates a change in the data voltage between the previous subpixel and the current subpixel in the case where the data processing device 700 does not perform the first compensation (overdriving or underdriving). The data voltage Vdata may be applied to the previous subpixel at the level of a first voltage V1, and may be applied to the current subpixel at the level of a second voltage V2 through one data line. The data voltage Vdata may vary from the first voltage V1 to the second voltage V2. Here, the data voltage Vdata may be delayed for a predetermined time, instead of immediately reaching the second voltage V2 from the first voltage V1. The data voltage Vdata may rise at a first time point T1 to reach the second voltage V2, which is a target value, at a second time point T2, and may be delayed for a period of time from the first time point T1 to the second time point T2.

On the other hand, FIG. 9 illustrates a change in the data voltage Vdata between the previous subpixel and the current subpixel in the case where the data processing device 700 performs the first compensation (overdriving or underdriving). As the data processing device 700 performs the first compensation, the delay of the data voltage Vdata may be reduced.

When the data processing device 700 performs the first compensation, a second voltage V2', which is greater than the second voltage V2, may be applied to the current subpixel. That is, a voltage greater than the original target voltage may be applied (overdriving). The data voltage Vdata of the current subpixel may be delayed for a predetermined time to reach the second voltage V2, but the delay time may be shortened. As the second voltage V2', which is greater than the second voltage V2, is applied to the current subpixel, the time point for reaching the second voltage V2 may be reduced from the second time point T2 to the second time point T2'.

If the first compensation of overdriving or underdriving is performed as described above, the time for applying the data voltage may be shortened, thereby quickly transferring the voltage to each subpixel and reducing the charging time of the subpixel.

Referring back to FIG. 7, the first compensation value calculating circuit 721*a* may receive, from the first comparing circuit 710*a*, a result of comparing the image data RGB_CUR of the current subpixel and the image data RGB_PRE of the previous subpixel, and may calculate a compensation value including how much the image data RGB_CUR of the current subpixel is to be compensate for. The first compensation value calculating circuit 721*a* may determine whether or not a grayscale value of the image data RGB_CUR of the current subpixel and a grayscale value of the image data RGB_PRE of the previous subpixel are different. If the grayscale value of the image data RGB_CUR of the current subpixel and the grayscale value of the image data RGB_PRE of the previous subpixel are different, the first compensation value calculating circuit 721*a* may calculate a compensation value for increasing or reducing the grayscale value of the image data RGB_CUR of the current subpixel. For example, if the grayscale value of the image data RGB_CUR of the current subpixel is greater than the grayscale value of the image data RGB_PRE of the previous subpixel, the first compensation value calculating circuit 721*a* may calculate a compensation value for increasing the grayscale value of the image data RGB_CUR of the current subpixel. If the grayscale value of the image data RGB_CUR of the current subpixel is less than the grayscale value of the image data RGB_PRE of the previous subpixel, the first compensation value calculating circuit 721*a* may calculate a compensation value for reducing the grayscale value of the image data RGB_CUR of the current subpixel.

Here, the first compensation value calculating circuit 721*a* may use a look-up table in order to calculate a compensation value for the compensated image data RGB_CUR' of the current subpixel. The first compensation value calculating circuit 721*a* may select a compensation value from values of the image data RGB_PRE of the previous subpixel and values of the image data RGB_CUR of the current subpixel in the look-up table.

Referring to FIG. 10, the rows N−1 of the look-up table may indicate image data of the previous subpixel, and the columns N thereof may indicate image data of the current subpixel. If the image data RGB_PRE of the previous subpixel is 32, and if the image data RGB_CUR of the current subpixel is 64, the compensated image data RGB_CUR' of the current subpixel may be 72. Since the compensated image data RGB_CUR' of the current subpixel must be increased by 8 to become 72, the compensation value may be +8. On the other hand, if the image data RGB_PRE of the previous subpixel is 64, and if the image data RGB_CUR of the current subpixel is 32, the image data RGB_CUR' of the current subpixel may be 27. Since the image data RGB_CUR of the current subpixel must be reduced by 5 to become 27, the compensation value may be −5.

Referring back to FIG. 7, the first compensation data generating circuit 722*a* may generate compensated image data RGB_CUR' of the current subpixel. The first compensation data generating circuit 722*a* may receive a compensation value for reducing or increasing the image data RGB_CUR of the current subpixel from the first compensation value calculating circuit 721*a*. The first compensation data generating circuit 722*a* may reduce or increase the grayscale value of the image data RGB_CUR of the current subpixel by the compensation value, thereby generating compensated image data RGB_CUR' of the current subpixel.

The image data or the compensated image data may be stored in the storage circuit 730. The first data compensating circuit 720*a* may perform first compensation on the image data RGB_CUR of the current subpixel to generate compensated image data RGB_CUR' of the current subpixel, and may store the compensated image data RGB_CUR' of the current subpixel in the storage circuit 730. The compensated image data RGB_CUR' of the current subpixel stored in the storage circuit 730 may be used as compensated image data RGB_PRE' of the previous subpixel for the second compensation in the future. The compensated image data RGB_PRE' of the previous subpixel may be read out from the storage circuit 730 for the second compensation, and may be transmitted to the second comparing circuit 720*b*.

Subsequently, if the compensated image data RGB_CUR' of the current subpixel and the compensated image data RGB_PRE' of the previous subpixel are the same or different within a predetermined range, the second data compensating circuit 720*b* may further compensate for the compensated image data RGB_CUR' of the current subpixel such that the data voltage or grayscale value corresponding to the compensated image data RGB_CUR' of the current subpixel is reduced, thereby generating final compensated image data RGB".

The second comparing circuit 710*b* may compare the compensated image data RGB_CUR' of the current subpixel with the compensated image data RGB_PRE' of the previous subpixel. The second comparing circuit 710*b* may receive the compensated image data RGB_CUR' of the current subpixel from the first compensation data generating circuit 722*a* of the first data compensating circuit 720*a*, and may read out the compensated image data RGB_PRE' of the previous subpixel from the storage circuit 730. The second comparing circuit 710*b* may transfer a result of the comparison to the second data compensating circuit 720*b*.

The second compensation value calculating circuit 721*b* may receive the result of comparing the compensated image data RGB_CUR' of the current subpixel with the compensated image data RGB_PRE' of the previous subpixel from the second comparing circuit 710*b*, and may calculate a compensation value including how much the compensated image data RGB_CUR' of the current subpixel is to be compensated for. The second compensation value calculating circuit 721*b* may determine whether or not the value of the compensated image data RGB_CUR' of the current subpixel and the value of the compensated image data RGB_PRE' of the previous subpixel are the same or similar (the degree of difference within a predetermined range).

If the value of the compensated image data RGB_CUR' of the current subpixel and a grayscale value of the compensated image data RGB_PRE' of the previous subpixel are the same or similar (i.e., different within a predetermined range), the second compensation value calculating circuit 721*b* may calculate a compensation value for reducing the grayscale value of the compensated image data RGB_CUR' of the current subpixel. That is, the second compensation value calculating circuit 721*b* may calculate a reduction amount as the compensation value. The grayscale value of the compensated image data RGB_CUR' of the current subpixel may be reduced by the reduction amount, and final compensated image data RGB" including the reduced grayscale value may be generated.

The second compensation data generating circuit 722*b* may generate final compensated image data RGB". The second compensation data generating circuit 722*b* may receive a compensation value including the reduction amount of the compensated image data RGB_CUR' of the current subpixel from the second compensation value calculating circuit 721*b*. The second compensation data generating circuit 722*b* may reduce the grayscale value of the compensated image data RGB_CUR' of the current subpixel by the reduction amount according to the compensation value, thereby generating final compensated image data RGB".

In addition, the second data compensating circuit 720*b* according to another embodiment may reflect the difference between the compensated image data RGB_CUR' of the current subpixel and the compensated image data RGB_PRE' of the previous subpixel, thereby adjusting the compensated image data RGB_CUR' of the current subpixel. As the difference between the compensated image data RGB_CUR' of the current subpixel and the compensated image data RGB_PRE' of the previous subpixel is reduced, the second compensation value calculating circuit 721*b* of the second data compensating circuit 720*b* may configure the reduction amount of the compensated image data RGB_CUR' of the current subpixel to be larger. Alternatively, as the difference between the compensated image data RGB_CUR' of the current subpixel and the compensated image data RGB_PRE' of the previous subpixel is increased, the second compensation value calculating circuit 721*b* of the second data compensating circuit 720*b* may configure the reduction amount of the compensated image data RGB_CUR' of the current subpixel to be smaller.

The second data compensating circuit 720*b* may reflect the difference between the compensated image data RGB_CUR' of the current subpixel and the compensated image data RGB_PRE' of the previous subpixel to the generated final compensated image data RGB", and may perform additional adjustment, or may reflect the difference in advance, thereby generating final compensated image data RGB".

Further, the second data compensating circuit 720*b* may adjust the final compensated image data RGB" by reflecting the grayscale value of the compensated image data RGB_CUR' of the current subpixel. The second compensation value calculating circuit 721*b* of the second data compensating circuit 720*b* may receive the compensated image data RGB_CUR' of the current subpixel from the first compensation data generating circuit 722*a* of the first data compensating circuit 720*a*. As the value of the compensated image data RGB_CUR' of the current subpixel is increased, the second compensation value calculating circuit 721*b* of the second data compensating circuit 720*b* may configure the reduction amount of the compensated image data RGB_CUR' of the current subpixel to be larger. Alternatively, as the value of the compensated image data RGB_CUR' of the current subpixel is reduced, the second compensation value calculating circuit 721*b* of the second data compensating circuit 720*b* may configure the reduction amount of the compensated image data RGB_CUR' of the current subpixel to be smaller.

As described above, if the compensated image data RGB_CUR' of the current subpixel and the compensated image data RGB_PRE' of the previous subpixel are the same, or if the difference therebetween falls within a predetermined range, the data processing device 700 may reduce the value of the compensated image data RGB_CUR' of the current subpixel.

Therefore, the brightness of white (i.e., denominator) in the equation of the pure-color brightness ratio becomes smaller, so the pure-color brightness ratio itself may be increased. Accordingly, the pure-color brightness ratio for the frame including the final compensated image data RGB" may be greater than the pure-color brightness ratio for the frame including the image data RGB_CUR of the current subpixel.

Figure 11:
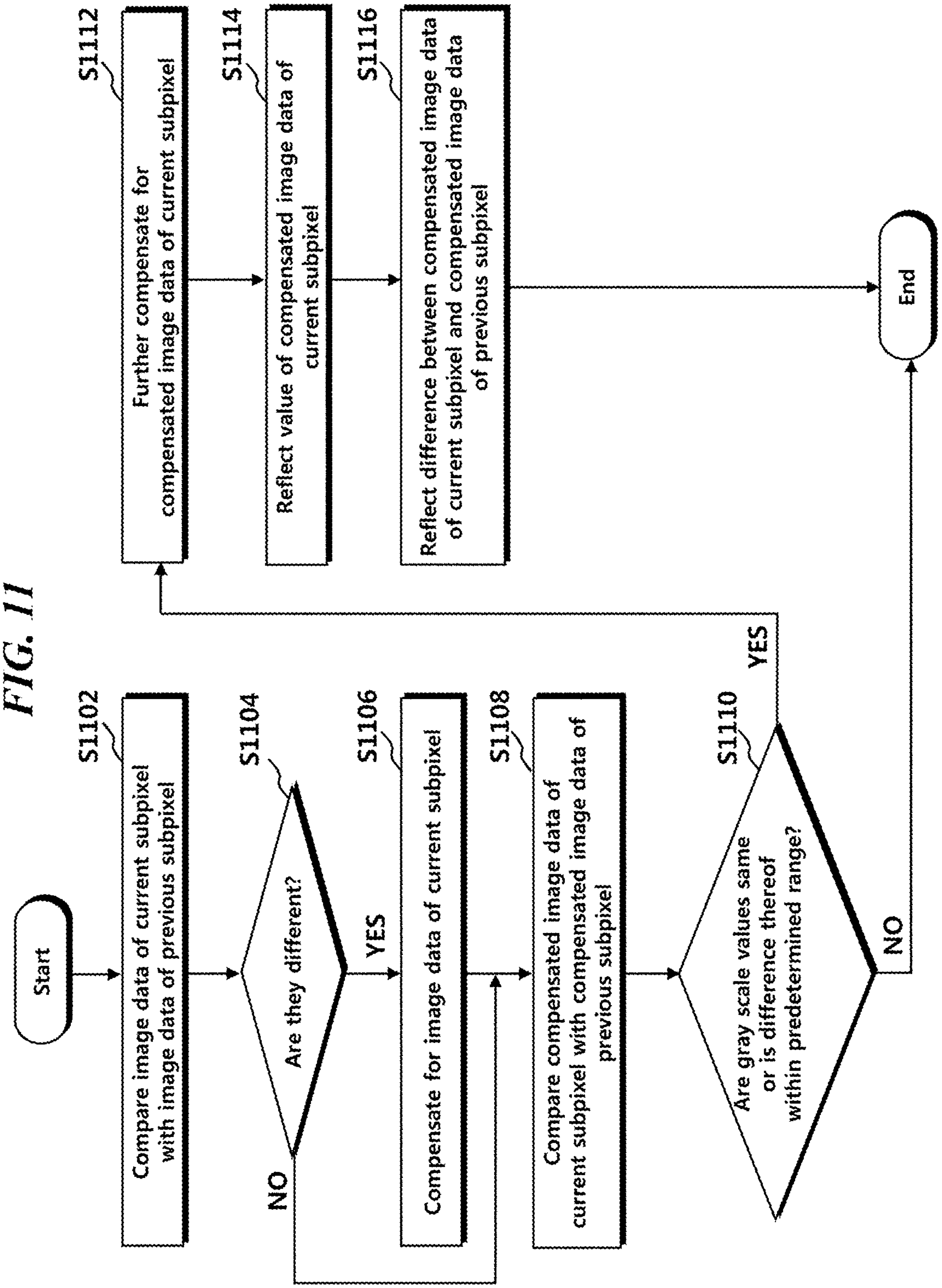
FIG. 11 is a flowchart illustrating the operation of a data processing device according to another embodiment.

FIG. 11 is a flowchart illustrating the operation of a data processing device according to another embodiment.

Referring to FIG. 11, the data processing device may compare image data of a current subpixel with image data of a previous subpixel, thereby performing first compensation for the image data of the current subpixel. Subsequently, the data processing device may perform second compensation on the result of the first compensation.

For the first compensation, the data processing device may compare the image data of the current subpixel with the image data of the previous subpixel (S1102). The data processing device may determine whether or not there is a difference between the image data of the current subpixel and the image data of the previous subpixel. A grayscale value of the image data of the current subpixel may be compared with a grayscale value of the image data of the previous subpixel.

If the image data of the current subpixel and the image data of the previous subpixel are different (YES in S1104), the data processing device may compensate for the image data of the current subpixel, thereby generating compensated image data of the current subpixel (S1106). A first data calculating circuit may calculate a compensation value for increasing or reducing a data voltage or grayscale value corresponding to the image data of the current subpixel. If the difference between the grayscale value of the current subpixel and the grayscale value of the previous subpixel falls outside of a predetermined range, the data processing device may determine that the image data of the current subpixel and the image data of the previous subpixel are different.

If the image data of the current subpixel and the image data of the previous subpixel are not different (NO in S1104), the first compensation is not required to be performed on the image data of the current subpixel. Instead, the data processing device may perform second compensation on the image data of the current subpixel, instead of the compensated image data of the current subpixel (S1108).

Next, for the second compensation, the data processing device may compare the compensated image data of the current subpixel with the compensated image data of the previous subpixel (S1108).

The data processing device may determine whether or not the compensated image data of the current subpixel and the compensated image data of the previous subpixel are the same or whether or not the difference therebetween falls within a predetermined range (S1110).

If the compensated image data of the current subpixel and the compensated image data of the previous subpixel are the same, or if the difference therebetween falls within a predetermined range (YES in S1110), the data processing device may further compensate for the compensated image data of the current subpixel (S1112). The data processing device may determine a reduction amount indicating how much the compensated image data of the current subpixel is to be reduced.

On the other hand, if the compensated image data of the current subpixel and the compensated image data of the previous subpixel are not the same, and if the difference therebetween falls outside of the predetermined range (NO in S1110), the data processing device may terminate the operation without performing the second compensation for the compensated image data of the current subpixel.

In addition, the data processing device may adjust the compensated image data of the current subpixel by reflecting the grayscale value of the compensated image data of the current subpixel (S1114). Further, the data processing device may adjust the compensated image data of the current subpixel by reflecting the difference between the compensated image data of the current subpixel and the compensated image data of the previous subpixel (S1116). In this process, the second data compensating circuit may perform additional adjustment on the generated compensated image data, or may reflect the grayscale value of the compensated image data of the current pixel or the difference in advance, thereby generating compensated image data.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A data processing device for generating image data for a first subpixel and a second subpixel of different colors, which are connected to one data line, the data processing device comprising:

a first data compensating circuit configured to generate compensated image data for applying overdriving or underdriving to grayscale values of image data for the first subpixel and the second subpixel that is driven after the first subpixel in sequence; and a second data compensating circuit configured, if a grayscale value of the compensated image data of the first subpixel and a grayscale value of the compensated image data of the second subpixel are identical or a difference between the grayscale value of the compensated image data of the first subpixel and the grayscale value of the compensated image data of the second subpixel falls within a predetermined range, to reduce the grayscale value of the compensated image data of the second subpixel, thereby reducing a brightness value of white, and thus increasing a pure-color brightness ratio, wherein the pure-color brightness ratio is defined as a ratio of a sum of brightness values of red, green, and blue to the brightness value of white, the first data compensating circuit is configured to generate the compensated image data based on a comparison of the image data for the first subpixel and the image data for the second subpixel, the second data compensating circuit is configured to:

compare the grayscale value of the compensated image data of the first subpixel to the grayscale value of the compensated image data of the second subpixel; and based on the comparison, determine whether the grayscale value of the compensated image data of the first subpixel and the grayscale value of the compensated image data of the second subpixel are identical or a difference between the grayscale value of the compensated image data of the first subpixel and the grayscale value of the compensated image data of the second subpixel falls within a predetermined range, and the grayscale value of the compensated image data of the second subpixel is reduced based on determining that the grayscale value of the compensated image data of the first subpixel and the grayscale value of the compensated image data of the second subpixel are identical or the difference between the grayscale value of the compensated image data of the first subpixel and the grayscale value of the compensated image data of the second subpixel falls within the predetermined range.

2. The data processing device of claim 1, wherein the second data compensating circuit is configured to reduce the grayscale value of the compensated image data of the second subpixel by reflecting the difference between the grayscale value of the compensated image data of the first subpixel and the grayscale value of the compensated image data of the second subpixel.

3. The data processing device of claim 2, wherein the second data compensating circuit is configured to reduce the grayscale value of the compensated image data of the second subpixel by a larger amount as the difference between the grayscale value of the compensated image data of the first subpixel and the grayscale value of the compensated image data of the second subpixel is reduced.

4. The data processing device of claim 2, wherein the second data compensating circuit is configured to reduce the grayscale value of the compensated image data of the second subpixel by a smaller amount as the difference between the grayscale value of the compensated image data of the first subpixel and the grayscale value of the compensated image data of the second subpixel is increased.

5. The data processing device of claim 1, wherein the second data compensating circuit is configured to determine a reduction amount of the grayscale value of the compensated image data of the second subpixel by reflecting the grayscale value of the compensated image data of the second subpixel.

6. The data processing device of claim 5, wherein the second data compensating circuit is configured to reduce the grayscale value of the compensated image data of the second subpixel by a larger amount as the grayscale value of the compensated image data of the second subpixel is increased.

7. The data processing device of claim 5, wherein the second data compensating circuit is configured to reduce the grayscale value of the compensated image data of the second subpixel by a smaller amount as the grayscale value of the compensated image data of the second subpixel is reduced.

8. The data processing device of claim 5, wherein the second data compensating circuit is configured to determine the reduction amount of the grayscale value for the compensated image data of the second subpixel using a look-up table.

9. The data processing device of claim 1, wherein the first subpixel and the second subpixel are arranged in a same row on a display panel, and are connected to different gate lines.

10. A data processing device for generating image data for a first subpixel, a second subpixel, and a third subpixel, wherein the first, second, and third subpixels are connected to a data line, the data processing device comprising:

a first data compensating circuit configured to generate first compensated image data of the second subpixel and first compensated image data of the third subpixel for overdriving or underdriving, wherein the first compensated image data of the second subpixel is generated through comparison of image data of the first subpixel and image data of the second subpixel, and the first compensated image data of the third subpixel is generated through comparison of the image data of the second subpixel and image data of the third subpixel; and a second data compensating circuit configured to:

compare a grayscale value of the first compensated image data of the second subpixel and a grayscale value of the first compensated image data of the third subpixel;

based on the comparison, determine whether the gray scale value of the first compensated image data of the second subpixel and the grayscale value of the first compensated image data of the third subpixel are identical or a difference between the grayscale value of the first compensated image data of the second subpixel and the grayscale value of the first compensated image data of the third subpixel falls within a predetermined range; and generate second compensated image data of the third subpixel by reducing the grayscale value of the first compensated image data of the third subpixel based on determining that the grayscale value of the first compensated image data of the second subpixel and the grayscale value of the first compensated image data of the third subpixel are identical or the difference between the grayscale value of the first compensated image data of the second subpixel and the grayscale value of the first compensated image data of the third subpixel falls within the predetermined range, wherein the second compensated image data of the third subpixel is generated through comparison of the first compensated image data of the second subpixel and the first compensated image data of the third subpixel, if a grayscale value of the first compensated image data of the second subpixel as a previous subpixel and a grayscale value of the first compensated image data of the third subpixel as a current subpixel are identical or a difference between the grayscale value of the first compensated image data of the second subpixel and the grayscale value of the first compensated image data of the third subpixel falls within a predetermined range, thereby reducing a brightness value of white, and thus increasing a pure-color brightness ratio, the pure-color brightness ratio is defined as a ratio of a sum of brightness values of red, green, and blue to the brightness value of white, the second data compensating circuit is configured to reduce the grayscale value of the first compensated image data of the third subpixel by a larger amount as the difference between the grayscale value of the first compensated image data of the second subpixel and the grayscale value of the first compensated image data of the third subpixel is reduced, and the second data compensating circuit is configured to reduce the grayscale value of the first compensated image data of the third subpixel by a smaller amount as the difference between the grayscale value of the first compensated image data of the second subpixel and the grayscale value of the first compensated image data of the third subpixel is increased.

11. The data processing device of claim 10, wherein the second data compensating circuit is configured to determine a reduction amount of the grayscale value of the first compensated image data of the third subpixel by reflecting the grayscale value of the first compensated image data of the third subpixel.

12. The data processing device of claim 11, wherein the second data compensating circuit is configured to reduce the grayscale value of the first compensated image data of the third subpixel by a larger amount as the grayscale value of the first compensated image data of the third subpixel is increased.

13. The data processing device of claim 11, wherein the second data compensating circuit is configured to reduce the grayscale value of the first compensated image data of the third subpixel by a smaller amount as the grayscale value of the first compensated image data of the third subpixel is reduced.

14. The data processing device of claim 11, wherein the second data compensating circuit is configured to determine the reduction amount of the grayscale value for the first compensated image data of the third subpixel using a look-up table.

15. The data processing device of claim 10, wherein the first subpixel and the second subpixel are arranged in a same row on a display panel, and are connected to different gate lines.

* * * * *